(12) United States Patent
Gupta et al.

(10) Patent No.: US 7,292,728 B1
(45) Date of Patent: Nov. 6, 2007

(54) BLOCK QUANTIZATION METHOD FOR COLOR HALFTONING

(75) Inventors: Maya Rani Gupta, Seattle, WA (US); Michael J. Gormish, Redwood City, CA (US); Kathrin Berkner, Palo Alto, CA (US); David G. Stork, Portola Valley, CA (US)

(73) Assignee: Ricoh Co., Ltd., Tokyo (JP)

( * ) Notice: Subject to any disclaimer, the term of this patent is extended or adjusted under 35 U.S.C. 154(b) by 1160 days.

(21) Appl. No.: 09/597,861

(22) Filed: Jun. 20, 2000

(51) Int. Cl.
*G06K 9/36* (2006.01)
*G06K 9/46* (2006.01)

(52) U.S. Cl. ............. 382/232; 382/266; 382/272; 358/539

(58) Field of Classification Search ........... 382/232, 382/251, 253, 266, 272; 358/539
See application file for complete search history.

(56) References Cited

U.S. PATENT DOCUMENTS 5,341,441 A * 8/1994 Maeda et al. ............... 382/253
5,377,018 A * 12/1994 Rafferty ................... 358/426.02
6,369,827 B1 * 4/2002 Pan et al. ................... 345/591

OTHER PUBLICATIONS

Harold H. Szu, Wavelet Applications IV, Apr. 22-24, 1997, pp. 656-667, vol. 3078.
Publisher; SPIE-The International Society for Optical Engineering.
Thrasyvoulos N. Pappas et al., Least-Squares Model-Based Halftoning, pp. 1102-1116, Aug. 1999, vol. 8, No. 8.
Acideh Zakhor et al., A New Class of B/W and Color Halftoning Algorithms, 1991, pp. 2801-2804.
David I. Neuhoff and Thrasyvoulos N. Pappas, Perceptual Coding of Images for Halftone Display, 1991, pp. 2797-2800.
Ronald S. Gentile, Eric Walowit, Jan P. Allebach, Quantization and multilevel halftoning of color images for near-original image quality, Jun. 1990, pp. 1019-1026, vol. 7 No. 6.
V. Ostromoukhov, R.D. Hersch, Structure Artifact Free Multi-Level Error Diffusion Algorithm, pp. 215-219.
Breaux, Nancy A. and Chu, Chee-Hung Henry, "Wavelet Methods for Compression, Rendering, and Descreening in Digital Halftoning," Proceedings SPIE—The International Society for Optical Engineering, vol. 3078, Apr. 22-24, 1997, pp. 656-667.
Pappas, Thrasyvoulos N. and Neuhoff, David L., "Least-Squares Model-Based Halftoning," IEEE Transactions on Image Processing, vol. 8, No. 8, Aug. 1999, pp. 1102-1116.
Zakhor, Avideh et al., "A New Class of B/W and Color Halftoning Algorithms," Department of Electrical Engineering and Computer Sciences, University of California, Berkeley, IEEE, CH2977-7/91/0000-2801, 1991, pp. 2801-2804.

(Continued)

Primary Examiner—Thomas D. Lee
(74) Attorney, Agent, or Firm—Blakely, Sokoloff, Taylor & Zafman LLP

(57) ABSTRACT

A method and apparatus for block quantization for color halftoning is described. In one embodiment, the method comprises dividing an input image and an output image into blocks, wherein each block in the output image corresponds to one block in the input image. The method also includes dividing each block into subblocks if an edge exists in said each block, calculating a color average of each input block, and calculating a set of output colors for each block in the output image to match the color average of its corresponding block in the input image.

33 Claims, 6 Drawing Sheets

OTHER PUBLICATIONS

Neuhoff, David L. and Pappas, Thrasyvoulos, N., "Perceptual Coding of Images for Halftone Display," IEEE, CH2977-7/91/0000-2797, 1991, pp. 2797-2800.

Gentile, Ronald S. et al., "Quantization and Multilevel Halftoning of Color Images for Near-Original Image Quality," J. Optical Society of America A, vol. 7, No. 6, Jun. 1990, 0740-3232/90/061019-08, pp. 1019-1026.

Ostromoukhov, V. and Hersch, R.D., "Structure Artifact Free Multi-Level Error Diffusion Algorithm," SPIE, vol. 3409, May 18-20, 1998, Zurich, pp. 215-220.

http://mathworld.wolfram.com/VectorNorm.html, Jul. 12, 2004 (2 pages).

http://planetmath.org/encyclopedia/BoundedFunction.html, Jul. 12, 2004 (2 pages).

Floyd, Robert et al., "4.3: An Adaptive Algorithm for Spatial Grey Scale," SID 75 Digest, pp. 36-37, Stanford University, Stanford, CA, U.S.A.

Ostromoukhov, V. et al., "Structure Artifact Free Multi-Level Error Diffusion Algorithm," Electronic Imaging: Processing, Printing, and Publishing in Color, May 1988, pp. 215-219, SPIE vol. 3409, The International Society for Optical Engineering, Zurich, Switzerland.

Akarun, Lale et al., "New Methods for Dithering of Color Images," pp. 523-526, Istanbul, Turkey.

Breaux, Nancy A., Wavelet Methods for Compression, Rendering, and Descreening in Digital Halftoning, Wavelet Applications IV, Apr. 22-24, 1997, pp. 656-667. SPIE vol. 3078.

The International Socieity for Optical Engineering, Orlando, Florida, U.S.A.

Wong, Ping Wah, "Halftoning by Multiscale Dot Distribution," 1995, 0-8186-7310-9/95, IEEE, Palo Alto, CA, U.S.A.

Wong, Ping Wah, "Mean Matching Halftoning on a Rotated Quad-Tree Structure," Human Vision and Electronic Imaging, Jan. 29-Feb. 1, 1996, pp. 448-455, SPIE vol. 2657, The International Society for Optical Engineering, San Jose, CA, U.S.A.

Nilsson, Fredrik, Objective Quality Measures for Halftoned Images, J. Opt. Soc. Am. A, 1999, pp. 2151-2162, vol. 16, No. 9, Optical Society of America, U.S.A.

* cited by examiner

Example
Dither matrix

| 1 | 8 | 7 | 4 |
|---|---|---|---|
| 3 | 14 | 10 | 15 |
| 6 | 12 | 5 | 9 |
| 13 | 2 | 0 | 11 |

(A)

Chosen
Output color set
0W
7Y
2C
3M
4B

| Y | C | C | Y |
|---|---|---|---|
| Y | B | M | B |
| Y | B | Y | M |
| B | Y | Y | M |

| $\frac{1}{24}$ | $\frac{1}{24}$ | $\frac{1}{24}$ | $\frac{1}{24}$ |
|---|---|---|---|
| $\frac{1}{24}$ | $\frac{1}{8}$ | $\frac{1}{8}$ | $\frac{1}{24}$ |
| $\frac{1}{24}$ | $\frac{1}{8}$ | $\frac{1}{8}$ | $\frac{1}{24}$ |
| $\frac{1}{24}$ | $\frac{1}{24}$ | $\frac{1}{24}$ | $\frac{1}{24}$ |

FIG. 6

BLOCK QUANTIZATION METHOD FOR COLOR HALFTONING

FIELD OF THE INVENTION

The present invention relates to the field of color halftoning; more particularly, the present invention relates to applying a block quantization technique to color halftoning.

BACKGROUND OF THE INVENTION

Color halftoning attempts to represent an image in multibit (e.g., 24 bits) color as an image with only a few colors and possibly increased spatial resolution. This is a problem faced by many color printers which commonly have only 5 or 8 colors available, such as, for example, cyan, magenta, yellow, black, white, and the combinations of cyan+magenta, cyan+yellow, magenta+yellow.

Judging color halftoning algorithms can be difficult due to the subjective nature of vision. Specific goals in halftoning algorithms include color matching, simple computation, low graininess, artifact minimization, and reduction of post-processing effects. The relative importance of each of these goals depends upon the human viewer, the expected viewing distance, and the target image.

Color matching itself has at least two objectives: closeness of individual input and output colors and consistent errors. Computation issues include running speed, parallelizability, memory size, and complexity. Graininess can be described as the ability to perceive distinct output colors (instead of the colors blending perfectly). Perceived grainess is a function, in part, of the dpi.

Detail information may be lost due to either poor spatial resolution or poor color resolution (or a combination of both). Artifacts are a general term for anything not desirable that is a result of the algorithm (as opposed to noise), including speckles, streaks, ghosts, gridding, texture, and very importantly, false contouring (also known as banding).

Post-processing effects are a concern because a halftoned image is not necessarily 'finished' when it is halftoned. Various image processing operations may still be performed on it, from downsampling to compression to edge enhancement. A halftoning algorithm may affect the success and ease of these operations.

Different techniques have been devised for halftoning, including dithering, error diffusion and iterative methods. Most color halftoning techniques simply extend a black-and-white halftoning technique to each of the three color planes individually. While computationally efficient, such component-wise extensions implicitly assume a mathematical linearity of ink colors. However, the subtractive color mixing in printing is nonlinear, and thus such plane-by-plane halftoning methods are suboptimal.

Dithering consists of adding a pseudorandom 2D periodic signal to each color component of the image, then quantizing each pixel to the closest output color. The dither signal is designed to generate patterns of alternating colors that blend to the eye. Different styles of dithering include clustered dot dithering, distributed dot dithering, and ordered dot dithering. Dithering with white noise does not achieve results as visually pleasing as more ordered dithering. Dithering is known to suffer from noticeable periodic patterning. Many efforts have tried to improve dithering. The application of dithering to color is in the art. For more information, see A. Karun, et al., "New Methods for Dithering of Color Images," Proc. of the IEEE Workshop on Nonlinear Signal/Image Processing, 1995.

While dithering is a point process (i.e., the output at each pixel depends only on the input pixel and possibly external factors like the dither signal), error diffusion diffuses the quantization error at each pixel to its neighboring pixels based on a directional spatial filter that sends a portion of the error in each forward direction. As a result, the error diffusion halftoning process adds high frequency noise. Since the goal is for the eye to blend the colors and not notice the actual mosaic of colors, this highpass filter effect of error diffusion exploits the eyes' insensitivity to high frequency noise. Thus, error diffusion yields a blue spatial spectrum. The idea that this blue noise is more visually pleasing is well-established.

Error diffusion works well. However, error diffusion has some drawbacks. It is a greedy algorithm in that it locally optimizes, that is, it does the best job it can at each pixel in space. Since the error is diffused forward, it is directional and cannot provide true joint optimization over a local region. An error may get diffused far beyond the point at which the eye is averaging color. Error diffusion artifacts include speckles, streaks, transient and edge effects, and grid effects at certain intensities. The feedback loop required for error diffusion can be a hindrance to parallel implementation of the algorithm.

Improvements have been made in error diffusion over many years. Efforts have been made in such directions as minimizing structural artifacts, making the feedback filter adaptive, and using neural networks.

Also, there are successful black-and-white halftoning techniques that use perceptual and printer models, but these require complex extensions for color halftoning.

There are additional black and white algorithms that consider the idea of mean-matching. For example, one multiscale halftoning algorithm begins at the resolution of the whole image and sets the output image average gray level equal to the input image average gray level. Then the next higher level of resolution proportionately splits up the average gray level amongst four quadrants based on their average gray levels. This process continues through the levels of resolution until each pixel is quantized black or white. For example, see Breaux, et al., "Wavelet Methods for Compression, Rendering, and Descreening in Digital Halftoning," SPIE Vol. 3078, 1997; P. W. Wong, "Halftoning by Multiscale Dot Distribution," Proc. IEEE Int. Conference on Image Processing, Vol. III, 1995; P. W. Wong, "Mean matching Halftoning on a Rotated Quad-tree Structure," Human Vision and Electronic Imaging," Proc. SPIE 2657, 1996.

In another prior art solution, the average gray levels of the input and output images are generated at various resolutions. In still another embodiment, wavelet averages are calculated and then dithering is used to approximate these gray-level averages. More specifically, the image is first compressed with wavelets and then the wavelet coefficients are used at each level as the average gray level to determine how white dots should be divvied up amongst the quadrants. This technique does not go down to the pixel level and tessellates the chosen number of white dots using a clustered dot or dispersed dot dither. Their results suffer from horizontal and vertical artifacts and false contouring.

SUMMARY OF THE INVENTION

A method and apparatus for block quantization for color halftoning is described. In one embodiment, the method comprises dividing an input image and an output image into blocks, wherein each block in the output image corresponds to one block in the input image. The method also includes dividing each block into subblocks according to a criteria, calculating a color average of each input block, and calculating a set of output colors for each block in the output image to match the color average of its corresponding block in the input image.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIGS. 5A and 5B illustrates laying out a chosen color set.

FIG. 6 is an example of weighting.

DETAILED DESCRIPTION

Figure 1:
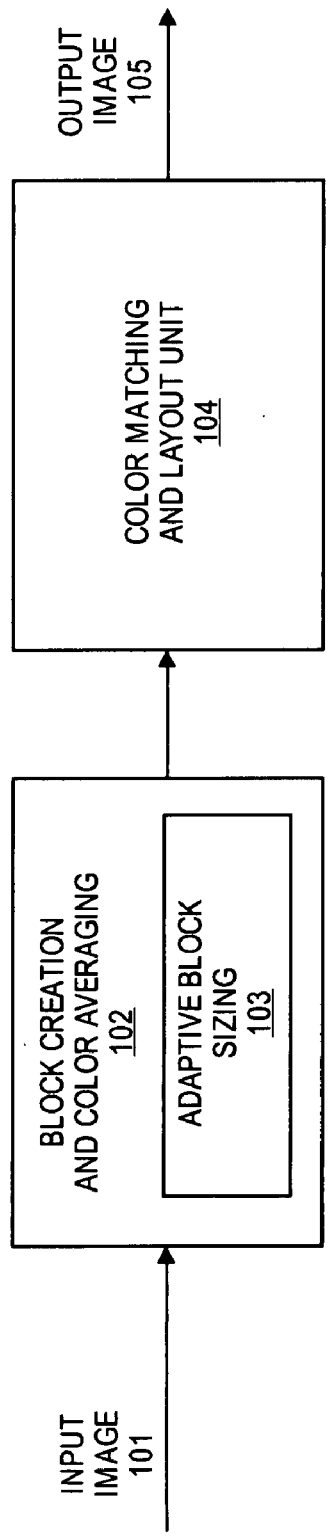
FIG. 1 is a block diagram of one embodiment of block quantization system for halftoning.

A block quantization method and apparatus are described. In the following description, numerous details are set forth. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Overview of Block Color Quantization

The present invention performs color halftoning using block quantization with adaptively sized input blocks. FIG. 1 is a block diagram of one embodiment of a block quantization system for color halftoning. The block quantization system performs a color match between the input domain of the system and the output domain of the system to achieve color halftoning where the number of colors in the input domain is greater than the number of available colors in the output domain. The system performs the color matching by dividing images in the input and output domains into multiple blocks and matching the color average of each block in the image in the input domain with a color average for a block in the image in the output domain. The blocks may be any shape, including complex shapes that are combinations of two or more shapes. For example, the blocks may be a square (d×d), but they may be rectangular (d×b) where d and b are not equal.

In one embodiment, the input domain comprises a computer system having a monitor and the output domain comprises a printer. For each small block of an input image, the block quantization technique described herein computes a set of the printing colors for a corresponding output block that best renders (under a principled distance measure in one embodiment) the input block's color average. In this manner, the halftoning technique described herein ensures that for each local input region the average color matches the average color of the corresponding local output region, where the regions are small enough to ensure that the eye averages over them. The block quantization technique exploits the higher spatial resolution of the printing process to achieve better color resolution and yields constrained local color optimality. Speckle, texture, and other artifacts common with error-diffusion methods are substantially avoided.

The technique treats each input color as a 3-dimensional (3D) vector in color space and, in one embodiment, generates halftones using the actual output colors obtained in a subtractive printing process.

Referring to FIG. 1, an input image 101 is received by a block creation and color averaging unit 102 that divides input image 101 into blocks and generates an average color value for each of the blocks. In one embodiment, the blocks are fixed-size.

Block creation and color averaging unit 102 may include adaptive block sizing unit 103 that further divides an individual block into sub-blocks if the individual block contains an edge. In one embodiment, the number of sub-blocks is four; however, any number of sub-blocks may be used. Adaptive block sizing unit 103 may iterate on the blocks, further dividing each individual block, which may be a fixed size, into sub-blocks until each block does not contain an edge or meets some other specific criteria. In alternative embodiments, one, more, or all blocks may contain an edge and still not be divided into subblocks. In one embodiment, a block containing an edge may not be divided into sub-blocks in cases, for example, where dividing the block further causes lower color resolution. Note that such an embodiment requires feedback which has not been shown in FIG. 1 to avoid obscuring the present invention.

In one embodiment, to determine if each block contains an edge, the average vector color value is calculated and compared to the averages of multiple (e.g., four) sub-blocks in the block. If the difference between the block and the averages of sub-block passes a threshold, then the block is deemed to have an edge and is further divided into the constituent sub-blocks. This may be repeated until blocks are a predetermined size. For example, when initially using 4×4 block pixels, the adaptive block sizing may continue until the blocks are 1×1 blocks of pixels.

Given an input block's color average as a target, a color matching and layout unit 104 computes a set of output colors that will average as close as possible to the target value. In one embodiment, color matching and layout unit 104 computes the output color set by examining the possible values achievable in the color space of the output image and identifying the closest achievable value to the target.

Given the output color set, color matching and layout unit 104 positioning the colors to achieve the desired color and to reduce, and maybe even minimize, artifacts and graininess.

Figure 2:
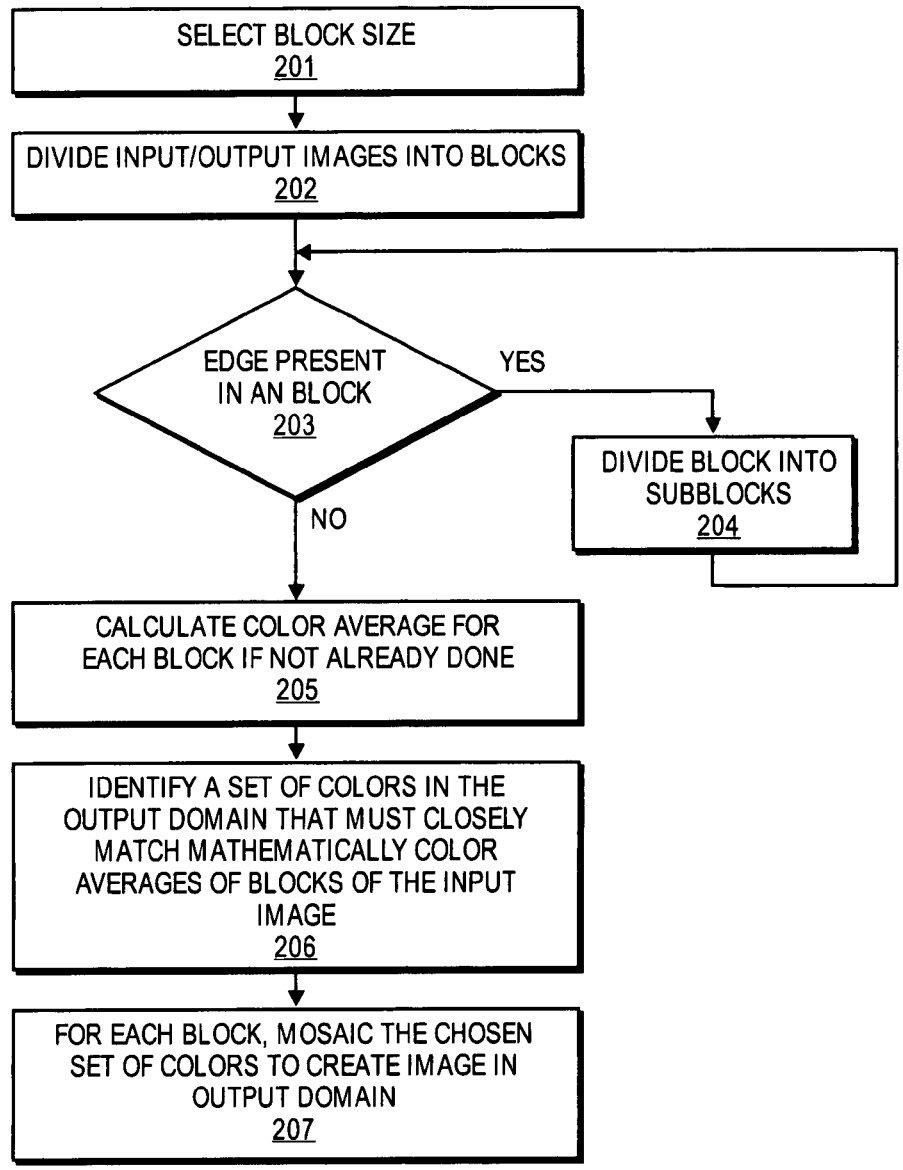
FIG. 2 is a flow diagram of one embodiment of the process for implementing block quantization with halftoning.

FIG. 2 is a flow diagram of one embodiment of the processing operations of the block quantization technique described herein. The process is performed by processing logic that may comprise hardware, software or a combination of both.

Referring to FIG. 2, the process begins with processing logic selecting a block size that the eye will average over in the input domain (processing block 201). In one embodiment, the block size is square (d×d). In alternative embodiments, the block size is not square (e.g., a rectangle, diamond, etc.).

Next, processing logic divides the input and output images into corresponding blocks (processing block 202). For each input block there is a corresponding output block with n pixels (where n depends on the output spatial resolution and the size of the input block).

Then, processing logic determines if there is an edge within each block (processing block 203). There are many ways to determine if there is an edge within a block. As discussed above, in one embodiment, an edge is present if the difference between the color average of the block and its sub-blocks exceeds a threshold. If there is an edge, processing logic divides that block into sub-blocks with no edge (processing block 204). This is referred to herein as quadtreeing.

In one embodiment, four-by-four blocks of pixels are first considered, and then the input average of the entire 4×4 block is compared to the averages of the 2×2 sub-blocks in order to determine whether or not there is a spatial edge in the input image as part of a thresholding process. If it is deemed that there is an edge, a color match is found independently for each 2×2 block. If the thresholding process determines there is no discernible edge, then the 4×4 block is color quantized as a whole. In one embodiment, this process is repeated until a 1×1 block size is considered.

In one embodiment, the thresholding is based on the Euclidean distance between the 4×4 average and each of the 2×2 averages. If the Euclidean distance is over the threshold for any of the 4 sub-blocks than the 4×4 block is broken up. In general, thresholding is based on a function of the color values in some colorspace (e.g., RGB, or some other color space). Thresholding may compare subblock values to each other or to the whole block's value.

Once the blocks no longer need to be broken into sub-blocks, and assuming such an operation has not occurred earlier, processing logic calculates the color average $A_i$ of each input block (processing block 205). In one embodiment, an arithmetic average over the block (equivalent to a 2D Haar wavelet) is used to generate a value for each block indicative of its color. A different wavelet or eye filter model may be used to define the color average of blocks in the input domain, or a different sense of average may be used, such as, for example, a geometric average or L2 average. Furthermore, the average may be taken over the Cartesian coordinates or over another indexing of the space, such as polar coordinates.

Next, processing logic identifies a set of colors in the output domain that most closely match mathematically color averages of blocks of the input image (processing block 206). In on embodiment, processing logic computes integer coefficients $\beta_i$ over the basis set of output colors B represented by the following equation of a distance measure:

$$\text{argmindist}[\text{Avg}(\beta_i \cdot B), A_i] \qquad (1)$$

This operation is constrained so that each of the n output pixels is assigned a color. Thus, $$\sum_{i=i}^{b} \beta_i = n \qquad (2)$$

where "n" is the number of pixels in the output block and "b" is the number of output colors. The same color averaging technique (equation 1 above) that is used to determine the averages of the blocks in the input image may be used as well. This process reduces, and may even minimize, a distance between the colors available in the input domain and the colors available in the output domain. Note that various distance measures may be used such as, for example, Euclidean, Manhattan, the L1, L2, and L∞ norms.

Finally, given the set of output colors $\beta_i \cdot B$ for a given output block, processing logic "mosaics" the chosen set of colors within the block to create an image in the output domain (processing block 207). In one embodiment, the processing logic attempts to best match the color of the corresponding block in the input image and reduce, and maybe even minimize, spatial artifacts. Given the set of output colors $\beta_i \cdot B$ for a given output block, the arrangement of the colors within the block has a significant effect on spatial artifacts and perceived color. In one embodiment, random sampling, regular gridding, and arranging the colors using a blue noise dither matrix are used, independently or adaptively switching, to achieve visually pleasing effects. Note that an indication may be generated by processing logic, which it sends to an output device (e.g., print engine) to dictate how the output device is to position the chosen set of colors on the piece of paper.

The process is applicable in various color spaces, including, for example, RGB and CIELAB.

The block quantization technique achieves constrained local color optimality and does not suffer error-diffusion type artifacts. Color matching, spatial resolution, and color resolution rival that of error diffusion. Solving the minimization problem is the computationally intensive part of the algorithm and may be sped up by the use of integer programming, dynamic programming, or a look-up table. For instance, a simple but memory intensive look-up table would take a block color value as input and return the number of pixels to use of each of the outputs colors for that block. For example, for a monitor to 4 color printer quantization, an input block might have an average RGB value of (122, 33, 250). This could be input to a look-up-table for blocks of size 16 output pixels. The look-up table might return: 13 cyan, 3 magenta, 0 yellow, 0 black and 0 white. Also, the algorithm may be sped up by finding approximate solutions, for instance, by framing the problem as a matrix inversion and solving it via a maximum entropy method or linear programming method or an approximate look-up-table could be used. Or it could be solved approximately by dynamic programming.

A Spatial Filter and Alternatives

An aim of certain embodiments of the block quantization techniques described herein is to match the average color of a local input region (e.g., block) to the average color of the corresponding local output region. The average of a local region can be found by applying a spatial filter over the local region, weighting the values. An example of weighting is shown in FIG. 6. For example, a rect filter may be used. If so, the pixel in the region is counted evenly with all the other pixels in the region.

A non-Rect filter may be used to compute the average in the input domain and/or to compute the output color set.

A wavelet filter may be used to determine the average. In one embodiment, the high-pass wavelet components may be used to determine whether or not there was an edge. In this manner, the high-pass wavelet filters are used for the quadtree thresholding.

The calculated average depends on the color space used. Different color spaces may be used. Color spaces include, but are not limited to, RGB, CIELAB, CIELUV, as well as Ohta, Opponent, log Opponent, HSV, HUV, and YCbCr.

The shapes of input and output regions may be viewed with a preference towards circular regions. Those shapes that strayed from a general circular form generally provide less favorable results.

The size of the regions is selected to avoid considering regions too large, resulting in a loss of the validity of the eye averaging assumption. Regions too small restrict color resolution. Regions too big cause loss of ability to resolve spatial detail. Thus, within the eye averaging size, there is a trade-off between color resolution and spatial resolution, neglecting either may cause loss in detail information.

Choosing the Set of Output Colors

Figure 3:
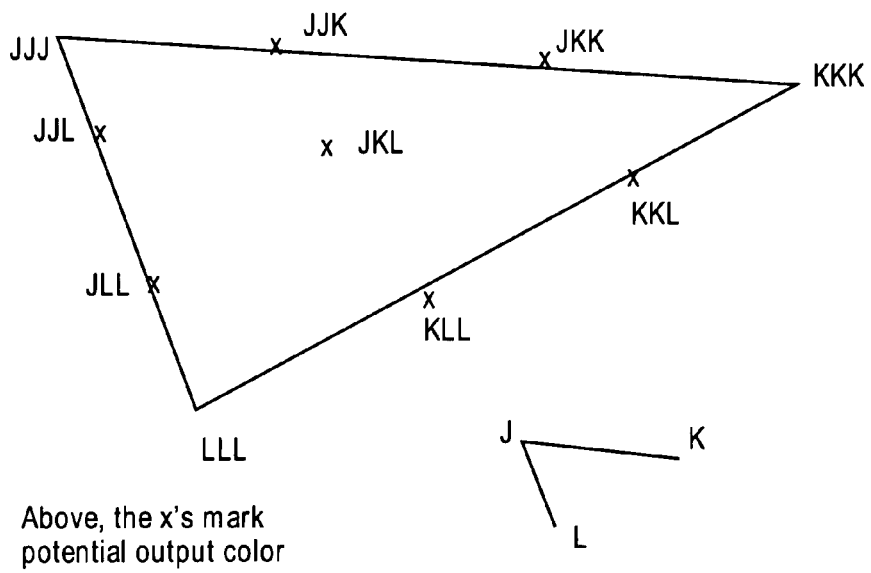
FIG. 3 illustrates potential output color sets.

A method to find a mathematically optimal set of n output colors from B possible colors is described below. First, consider a simpler problem of choosing n=3 output colors from a 2D color space delimited by B=3 possible colors: J, K, and L. Referring to FIG. 3, the x's mark potential choices for the set of n chosen output colors: JJJ, JJK, JKK, etc. Two vectors JK and JL may be defined which are 1/n the length of the distance between the "anchors" J, K, and L. The vectors JK and JL form a vector basis that spans the 2D color space.

Gram-Schmidt orthogonalization of the vector basis may be used to generate an orthogonal vector basis. A given input target color point can be imagined as a vector from the origin J to the target. This J target vector can be decomposed onto the orthogonal basis and reconstituted as coefficients of the original JK and JL vectors. These two coefficients specify how many output colors should be K and how many output colors should be L (then the remaining colors in the set of output colors should be J). The Gram-Schmidt process results in an exact breakdown of n colors into J, K, and L to achieve the target. However, only integer solutions may be used. Therefore, in one embodiment, the closest integer solution is chosen as the output color set.

With a 3D color space, the same vector technique can be used to solve for n with B equal to up to four possible colors. However, with more than four colors in 3D or more than three colors in 2D, the vector basis is redundant (e.g., the problem of decomposing the target onto the original vectors exactly is undetermined, so there are many solutions although not necessarily any exact integer solutions).

For more than four colors, one solution includes considering each possible integer number of the fifth color 0 through n, decompose the (target average—fifth color contribution) onto the remaining four colors. Thus, for five colors, the four color solution is found. A close integer solution is typically found unless the target color is out of the convex hull formed by the output inks.

A linear programming formulation may be used to find the appropriate set of output colors to match an input target. Linear programming searches for a solution that reduces, or may be even minimizes, the distance between the target color and the output color average, but the distance reduced (minimized) cannot be the Euclidean distance (equal L2 norm squared). Instead, linear programming reduces the L1 or sup norm. Quadratic programming may be used to reduce, or may be even minimize, the Euclidean distance.

A table look up may be used to speed up the process of choosing an output set. This is particularly advantageous in selections where the output colors are known beforehand, such as with, for example, printers. In one embodiment, the LUT has a memory cell for every possible input color. In an alternative embodiment, the LUT is programmed with the different output color sets and/or an input color locates the closest output color. This requires less memory, more processing, and may give inexact answers.

In one embodiment, the colorspace is divided into quantifiable cells beforehand. All input averages that fall in a given cell are quantified to that cell's centerpoint.

As discussed above, in one embodiment, given an input vector color average, an output set of colors is chosen to reduce or minimize the Euclidean distance between the input average and the chosen set of output colors. In alternative embodiments, the Manhattan distance or Component-Wise Max may be reduced, or may be even minimized.

As discussed above, an average is taken over the set of input colors and the set of chosen output colors, then the Euclidean distance is reduced (and may be minimized). Instead of computing an average for each block, a distance measure (e.g., the Earth Mover's Distance (EMD)) can be used to determine the distance between the input block and the proposed output colors. In one embodiment, EMD is used to select between a few possibilities that were quickly generated by some quicker output set generator. For more information on the EMD, see Rubnex, Tomasi, Goibas, ICCV 1998.

Tessellating the Output Colors

Given a chosen set of output colors, the problem remains to decide how to position them down in the output space. For example, positioning 3 red pixels and 3 green pixels as

RRR
GGG or

RGR
GRG may influence the perceived color, the graininess, and the amount of false contouring. A number of different tessellation schemes may be used, including, for example, regular gridding, and random sampling (with and without replacement), and using the values of a blue dither matrix to order the chosen output pixels.

Regular gridding can be performed in two ways. One way is to lay all the pixels of a given output color out in the block at once, then do the next output color, and so on. For example, 8R and 8G would become:

RRRR
RRRR
GGGG
GGGG

This method avoids isolated colors. In an alternative embodiment, a regular grid may be used that alternates as much as possible. This yields well-blended images. In this case the 8R and 8G becomes

RGRG
GRGR
RGRG
GRGR

Another way to tessellate a block is random sampling. Given that 8R and 8G are to be placed in a block, for each pixel of the output block that this distribution may be randomly sampled, with or without replacement. This tends to lead to grainy-looking images however.

A visually pleasing way to tessellate is to lay the chosen output colors down in a blue spatial frequency pattern. One way to achieve this is to choose a dither matrix designed for this purpose. The output colors are ordered in some fashion, such as, for example, by luminance. For example, the output colors could be WYCMK, where K is black. Then lay the chosen output colors down in the dither order. FIGS. 5A and 5B illustrate an example. If a 4×4 dither matrix looks like FIG. 5A, then the chosen set of output colors looks like the matrix in FIG. 5B.

Dither matrices larger than a given block can be used, but then a block just uses the ordering of the values it covers.

The average may be represented better at all resolutions using either a deterministic approach or a stochastic approach that tries to more closely match the averages of a block's subblocks (when the block wasn't split as discussed above with respect to thresholding). For 4×4 blocks, after the 16 output colors are chosen, they can be divided up into four groups of four based on the average of each of the 2×2 subblocks.

Exemplary Applications

Figure 4:
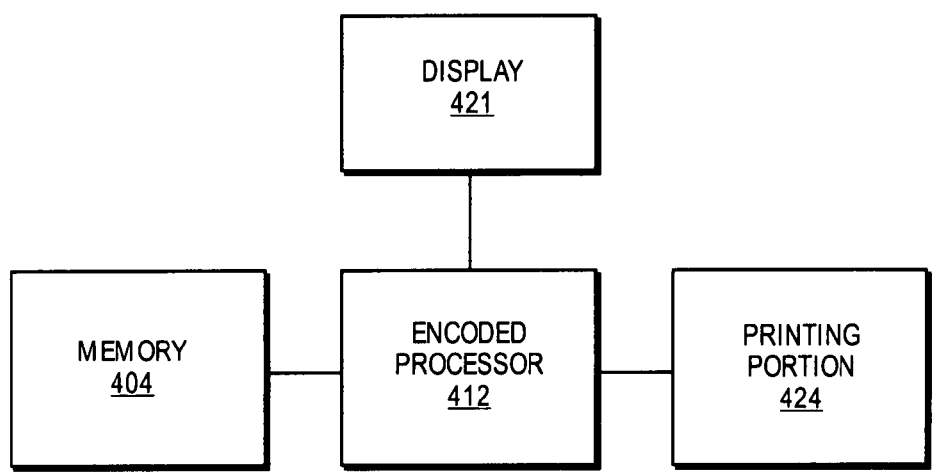
FIG. 4 is a block diagram of one embodiment of a system having block quantization processing.

In one embodiment, the block color quantization is performed by an embedded processor in a system, such as, for example, a copier or a printer. The algorithm might be on an application specific integrated circuit (ASIC). FIG. 4 is a block diagram of an exemplary system that may include processing for the block quantization technique described above.

Referring to FIG. 4, system 400 comprises an embedded processor 412 coupled with the embedded processor 412 for processing information. System 400 further comprises a random access memory (RAM), or other dynamic storage device 404 coupled to embedded processor 412 for storing information and instructions to be executed by embedded processor 412.

Computer system 400 may further be coupled to a display device 421, such as a cathode ray tube (CRT) or liquid crystal display (LCD), coupled to embedded processor 412 for displaying information to a system user. An alphanumeric input device, including alphanumeric and other keys, may also be included in the system for communicating information and command selections to embedded processor 412. An additional user input device is cursor control, such as a mouse, trackball, trackpad, stylus, or cursor direction keys, may be included in the system for communicating direction information and command selections to processor 412, and for controlling cursor movement on display 421.

A print engine 424 is coupled to embedded processor 412. In one embodiment, the print engine 424 is part of a copier. Note that any or all of the components of system 400 and associated hardware may be used in the present invention. However, it can be appreciated that other configurations of the system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method comprising:
   dividing an input image and an output image into blocks, wherein each block in the output image corresponds to one block in the input image;
   calculating a color average of each input block;
   calculating a set of output colors for each block in the output image to match the color average of its corresponding block in the input image; and
   generating an indication to control positioning of the set of output colors in said each block of the output image to match a target color and reduce spatial artifacts given the set of output colors.

2. The method defined in claim 1 further comprising dividing each input and output block into subblocks in response to a certain criteria being met.

3. The method defined in claim 2 wherein the criteria for dividing a block into subblocks is whether the block contains an edge.

4. The method defined in claim 1 wherein characteristics of the block are such that a human eye averages colors associated with the block.

5. The method defined in claim 4 wherein the characteristics include one or more of size, shape and expected viewing distance.

6. The method defined in claim 1 wherein calculating the set of output colors is performed by examining possible values achievable in a color space and locating an achievable value closest to the color average of the corresponding input block.

7. The method defined in claim 1 wherein calculating the set of output colors comprises using a look-up table on the average color to determine output colors in the set.

8. The method defined in claim 7 wherein the average color distance output color is set either exactly or approximately.

9. The method defined in claim 1 further comprising positioning colors within each block to match a target color and reduce spatial artifacts given the set of output colors.

10. The method defined in claim 1 wherein generating an indication to control positioning colors within each block comprises performing regular gridding.

11. The method defined in claim 1 wherein generating an indication to control positioning colors within each block comprises using a dither matrix ordering of the chosen output colors.

12. A method comprising:
dividing an input image and an output image into blocks, wherein each block in the output image corresponds to one block in the input image, wherein dividing the input image and the output image into blocks comprises dividing a block of the input image into subblocks by:
calculating a function of the color value for each block and for each of a plurality of subblocks in said each block;
determining if the distance between the function of the color value of the block and subblocks is greater than a threshold;
dividing the block into subblocks if the difference is greater than the threshold;
calculating a color average of each input block;
calculating a set of output colors for each block in the output image to match the color average of its corresponding block in the input image; and
generating an indication to control positioning of the set of output colors in said each block of the output image.

13. The method defined in claim 12 further comprising determining an edge exists by comparing a function of color values for each subblock to the function's value for the other subblocks of the block.

14. The method defined in claim 12 wherein the plurality of subblocks comprises four subblocks.

15. An article of manufacture having a computer readable storage medium storing executable instructions which, when executed by a system causes the system to perform the method comprising:
dividing an input image and an output image into blocks, wherein each block in the output image corresponds to one block in the input image;
calculating a color average of each input block;
calculating a set of output colors for each block in the output image to match the color average of its corresponding block in the input image; and
generating an indication to control positioning of the set of output colors in said each block of the output image to match a target color and reduce spatial artifacts given the set of output colors.

16. An apparatus comprising:
a divider to divide an input image and an output image into blocks, wherein each block in the output image corresponds to one block in the input image;
first logic to calculate a color average for each input block;
second logic to calculate a set of output colors for each block in the output image to match the color average of its corresponding block in the input image; and
indication generation logic to generate an indication to control positioning of the set of output colors in said each block of the output image to match a target color and reduce spatial artifacts given the set of output colors.

17. The apparatus defined in claim 16 wherein the divider divides each input and output block into subblocks in response to a certain criteria being met.

18. The apparatus defined in claim 16 wherein the criteria for dividing a block into subblocks is whether the block contains an edge.

19. The apparatus defined in claim 16 wherein characteristics of the block are such that a human eye averages colors associated with the block.

20. The apparatus defined in claim 19 wherein the characteristics include one or more of size, shape and expected viewing distance.

21. The apparatus defined in claim 16 wherein the second logic to calculate the set of output colors examines possible values achievable in a color space and locates an achievable value closest to the color average of the corresponding input block.

22. The apparatus defined in claim 16 wherein the second logic to calculate the set of output colors uses a look-up table on the average color to determine output colors in the set.

23. The apparatus defined in claim 22 wherein the average color distance output color is set either exactly or approximately.

24. The apparatus defined in claim 16 further comprising control logic to position colors within each block to match a target color and reduce spatial artifacts given the set of output colors.

25. The apparatus defined in claim 24 wherein the control logic performs regular gridding within each block.

26. The apparatus defined in claim 25 wherein the control logic performs dither matrix ordering of the chosen output colors within each block.

27. An apparatus comprising:
a divider to divide an input image and an output image into blocks, wherein each block in the output image corresponds to one block in the input image, the divider comprising:
calculation logic to generate a function of the color value for each block and for each of a plurality of subblocks in said each block;
determination logic to determine if the distance between the function of the color value of the block and subblocks is greater than a threshold;
a divider to divide the block into subblocks if the difference is greater than the threshold;
first logic to calculate a color average for each input block;

second logic to calculate a set of output colors for each block in the output image to match the color average of its corresponding block in the input image; and indication generation logic to generate an indication to control positioning of the set of output colors in said each block of the output image to match a target color and reduce spatial artifacts given the set of output colors.

28. The apparatus defined in claim 27 further comprising determination logic to determine an edge exists by comparing a function of color values for each subblock to the function's value for the other subblocks of the block.

29. The apparatus defined in claim 27 wherein the plurality of subblocks comprises four subblocks.

30. An apparatus comprising:

means for dividing an input image and an output image into blocks, wherein each block in the output image corresponds to one block in the input image;

means for calculating a color average of each input block;

means for calculating a set of output colors for each block in the output image to match the color average of its corresponding block in the input image; and means for generating an indication to control positioning of the set of output colors in said each block of the output image to match a target color and reduce spatial artifacts given the set of output colors.

31. A method comprising:

dividing the input image and the output image into blocks comprises adaptively sizing blocks with edges to create a plurality of blocks without edges; and computing, as part of a halftoning process, a set of output colors that best renders a color average of the input image for the corresponding block, wherein the input image's color gamut is pre-warned to adjust for the output color gamut.

32. An apparatus comprising:

means for dividing the input image and the output image into blocks comprises means for adaptively sizing blocks with edges to create a plurality of blocks without edges; and means for computing, as part of a halftoning process, a set of output colors that best renders a color average of the input image for the corresponding block, wherein the input image's color gamut is pre-warped to adjust for the output color gamut.

33. An apparatus comprising:

a divider to divide the input image and the output image into blocks by means for adaptively sizing blocks with edges to create a plurality of blocks without edges; and computation logic to compute, as part of a halftoning process, a set of output colors that best renders a color average of the input image for the corresponding block, wherein the input image's color gamut is pre-warped to adjust for the output color gamut.

\* \* \* \* \*